Dec. 23, 1947.  B. RONAY  2,433,018
ADJUSTABLE ELECTRODE HOLDER
Filed Nov. 7, 1944  2 Sheets-Sheet 1
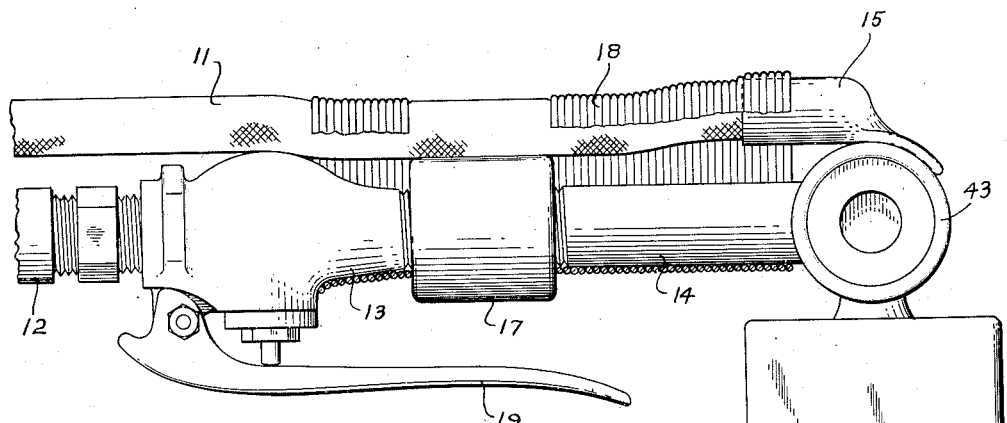
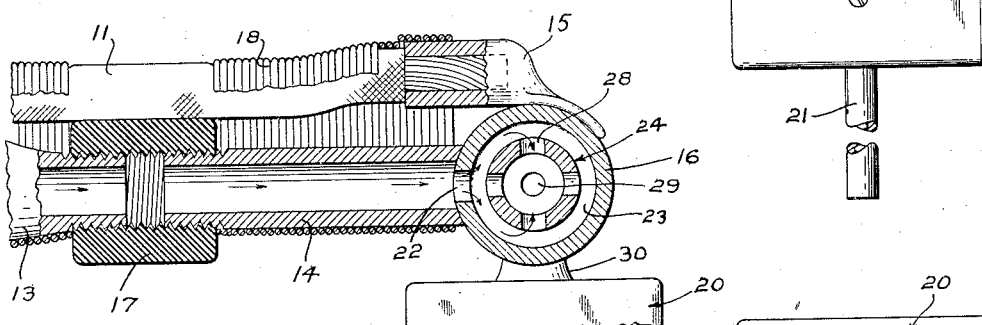
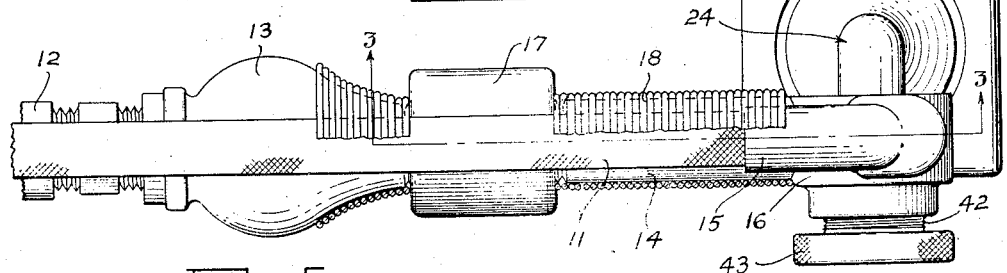
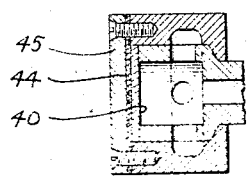
Inventor
Bela Ronay
By W. Glenn Jones
Attorney Dec. 23, 1947.                B. RONAY                2,433,018
                      ADJUSTABLE ELECTRODE HOLDER
                      Filed Nov. 7, 1944          2 Sheets-Sheet 2
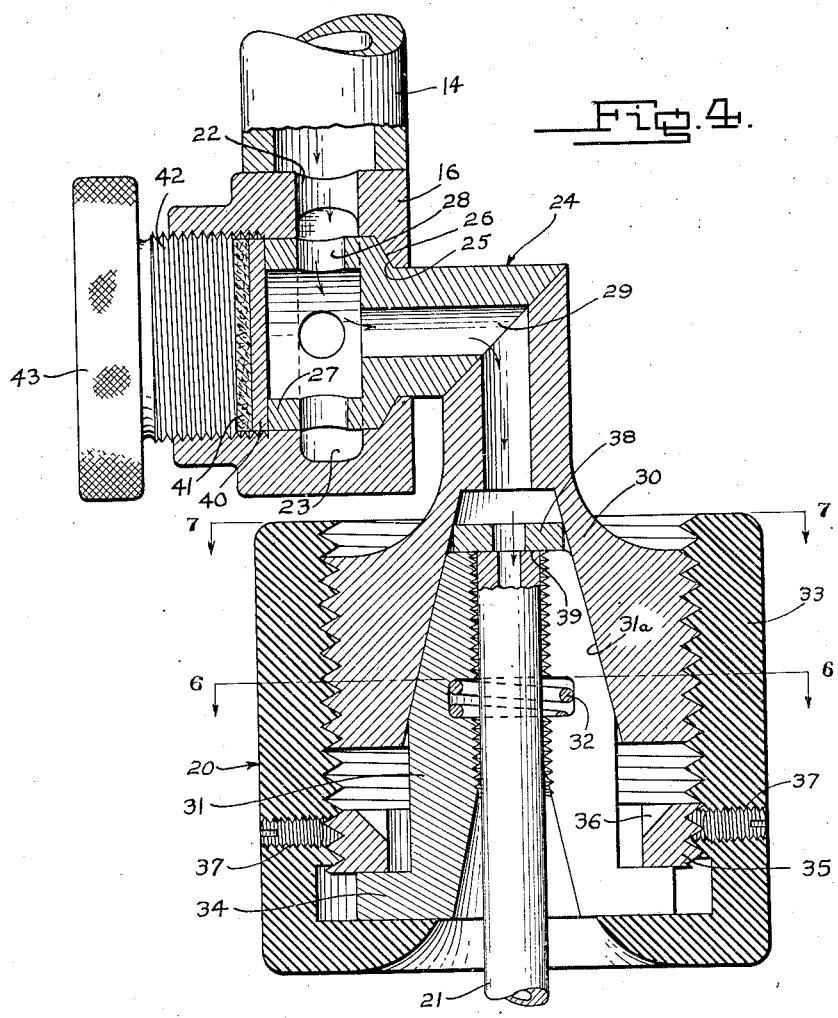
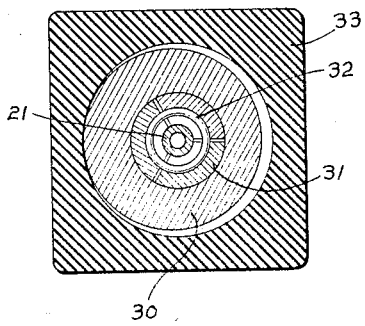
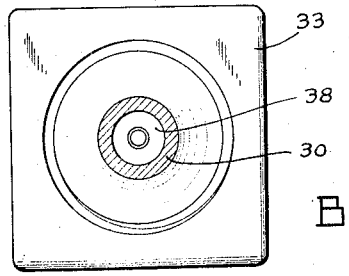
Inventor
Bela Ronay
By W Glenn Jones
Attorney Patented Dec. 23, 1947

2,433,018

UNITED STATES PATENT OFFICE 2,433,018

ADJUSTABLE ELECTRODE HOLDER

Bela Ronay, Annapolis, Md.

Application November 7, 1944, Serial No. 562,327

7 Claims. (Cl. 219—8)

(Granted under the act of March 3, 1883, as amended April 30 1928; 370 O. G. 757)

This invention relates to welding apparatus and more particularly to an improved holder for welding electrodes.

Heretofore various welding electrode holders have been employed wherein electrodes form one end of an electrical circuit and are manually applied to the work. Such holders do not permit ready angular adjustment of the electrode grasping head and are not readily applicable to combination oxy-electric welding and particularly to the performance of such welding under water.

The adjustment of electrode angle in prior constructions frequently can be accomplished only by the use of separate tools and by laboriously loosening a securing bolt, adjusting the parts and then retightening the bolt. Furthermore such prior constructions cannot be used with hollow electrodes through which a gas is passed.

It is an object of the present invention to provide an improved electrode holder having a swivel or pivot means providing rapid manual adjustment of the electrode holding chuck without the use of tools and to provide automatic retaining or locking means to keep the chuck in its adjusted position.

Another object of the present invention is to provide in combination with a swivel of the above character, fluid conducting means whereby a fluid such as oxygen may be conducted through the handle and chuck of the electrode holder to the point where the welding electrode contacts the work.

An additional object of the present invention is to provide a simple and improved electrode chuck housing which may readily be manipulated under difficult conditions such as during underwater welding operations. It is a further object to provide an electrode holder which will indicate when an electrode is exhausted by a portion of the chuck coming into contact with the work but will not cause secondary arcing connection with said work.

A further object of the present invention is to provide an improved electrode holder for tubular electrodes incorporating a fluid flow control valve and a pivotally mounted electrode engaging head.

Another object of the invention is to provide a holder primarily adapted to holding a hollow electrode, said holder having a common gas and electric current terminal consisting of a housing in which an articulated extension is swivelled, provision being made in a chuck carried by said extension to effect both a gas and electrical current seal with the end of a hollow electrode when gripped by the jaws of the chuck.

Still another object of this invention is to provide an electrode holder which is sturdy, fully enclosed, simple to adjust and operate, and which may readily be used under difficult conditions with a minimum of mechanical skill and attention from the operator.

Other objects and advantages will be hereinafter more fully described and for a complete understanding of the nature, scope and characteristics of this invention reference may now be had to the following description and accompanying drawings, in which latter Fig. 1 is a side elevation of one embodiment of the present invention;

Fig. 2 is a top plan view of the embodiment shown in Fig. 1;

Fig. 3 is a detailed side elevation partially in cross-section of a portion of the embodiment illustrated in Figs. 1 and 2 and taken along a line substantially corresponding to line 3—3 of Fig. 2;

Fig. 4 is an enlarged cross-sectional view taken through the central axis of the swivel and chuck, showing details of their construction;

Fig. 5 is a detailed sectional view showing a modified swivel locking and sealing means;

Fig. 6 is a transverse sectional view, reduced in size, taken along a line substantially corresponding to line 6—6 of Fig. 4; and Fig. 7 is a view similar to Fig. 6 but taken along a line substantially corresponding to line 7—7 of Fig. 4.

Referring now to the drawings in detail, the embodiment illustrated comprises an electrode holder having a hand engaging portion formed by an insulated electric supply wire 11 and a fluid supply conduit including a fluid inlet line 12, a quick acting fluid control valve 13, and a conduit member 14.

The electric supply wire 11 has at its end a terminal or lug 15 which connects said wire to the outside housing 16 of the swivel joint. Since the conduit member 14 is connected into the housing 16, said housing constitutes a common fluid and electrical current terminal at the end of the handle.

A threaded sleeve 17 is provided to electrically insulate the conduit member 14 from the valve 13 so that the current from wire 11 is confined to the conduit member 14, housing 16 and adjacent parts.

It will be noted that the electric supply wire and the fluid conduit above described, lie closely adjacent so as to form together an elongated handle portion which may be grasped readily by the operator while using this electrode holder during a welding operation. The elongated handle so formed may be provided with a suitable insulating covering such, for example, as the closely wound strand of insulating material 18 which is shown partially broken away in Fig. 1 for purposes of illustration. With the above described arrangement it will be observed that an operating handle 19 for the quick acting valve 13 lies along the under surface of the electrode holder handle and is convenient for controlled and sustained manipulation by the operator during the welding process.

The mechanical arrangement which comprises the swivel or pivot means is enclosed within the housing 16 as shown in detail in Fig. 3 and in the enlarged view Fig. 4. The passage of gas or fluid under pressure through the swivel connection is shown by arrows and leads from inlet pipe 14 through opening 22 into an annular manifold or fluid collecting ring 23 within the housing 16 as best shown in Fig. 3.

Referring particularly to Fig. 4, a rotatably sealed elbow member 24 comprising an articulated extension of the handle, lies within housing 16 and has an enlarged base with an inclined surface 25 which bears against a corresponding inclined surface 26 within the housing 16 to provide a rotatable but gas tight engagement therebetween. This base has a skirt 27 which is surrounded by the annulus 23 and is provided with a plurality of openings 28 through which the gas may pass to the interior of the member 24 from whence it emerges through passage 29 to the chuck base 30.

The chuck 20 is of multiple segment design wherein split jaws 31 are urged into engagement with the outside surface of one end of an electrode. These jaws are enclosed in the externally threaded chuck base 30 having a conical internal surface 31a against which the inclined inner ends of the jaws bear. A spring 32 normally spreads the jaws and, in operation, they are forced together by rotation of an internally threaded chuck operating nut 33 so as to engage an object such as the electrode 21.

As an important feature of the present invention there is provided an exceptionally large chuck operating nut or sleeve which is made of a suitable moldable dielectric material, preferably of a light plastic substance which may be molded as an integral unit or may be formed from several layers cemented together and machined as desired. This operating nut or sleeve 33 is provided with a central electrode admitting opening.

The chuck jaws 31 are retained within the housing by means of outwardly extending jaw flanges 34. An externally threaded ring 35 may be threaded within the housing 33 so as to bear against one side of the jaw flanges 34. This ring 35 may have a pair of oppositely disposed grooves 36 to facilitate its insertion by the use of a suitable spanner type wrench (not shown). When in place ring 35 may be secured by set screws 37 or other suitable locking means.

It will be noted that when electrode 21 is inserted within the chuck its end 39 bears against an inherently loose sealing washer 38 so as to provide a positive seal between the passage 29 and the hollow interior of the electrode.

It is also noted that during operation the chuck jaws grasp the electrode and simultaneously move it back so that the open end 39 is forced into snug sealing engagement with the seal 38. The washer thus has two important purposes: first, it produces a fluid seal between the wall 31a of the chuck base 30 and the end of the hollow electrode and, second, it produces a tight contact or electrical seal which insures the full conduction of electrical current to the electrode. These purposes are furthered by the self-adaptability of the washer to the chuck as the jaws are tightened.

Any desired shape may be imparted to the chuck nut 33 but the shape shown in Figs. 6 and 7 wherein it forms a large square or block has been found to be of particular value, especially when the chuck is being operated under water where the diver-operator's sense of touch is greatly diminished by reason of the thick rubber gloves he is wearing inside of which he is apt to have another pair of fur or wool lined mittens or gloves.

The bulk of the plastic head not only permits the operator to locate the chuck head quickly in the underwater darkness or murk, but he can grip it positively and perform electrode changing with a measure of accuracy and dispatch. The large chuck head or nut 33 when made of plastic material weighs only a fraction of that made of even the lightest alloy applicable. This absence of a concentrated weight at the end of the electrode holder gives it the desired balance and enables the diver-operator to work for a longer period of time without tiring. Another important feature is that the large nonconducting nut 33 serves as a telltale, informing the diver-operator that the electrode 21 has been consumed to within a fraction of an inch of the outer surface of the nut when the latter touches the grounded work. With the outer casing being a dielectric, no secondary arc is formed. Electrode holders not so equipped may be damaged by puncturing a portion of the holder or "freezing" the threaded portions of the nut together by a secondary arc.

In order to retain the swivel in its adjusted position a suitable friction brake or locking device, is provided. As illustrated it may comprise a disc 40 of brass or other suitable material which bears against the end of the skirt 27. Behind this disc 40 is provided a similarly shaped disc 41 of fibrous or other similar material which is preferably somewhat compressible. These discs are urged forward by a threaded plug 42 which has a knurled finger engaging rim 43 so that the pressure applied to the disc may manually be increased or changed as desired. Pressure so applied urges the parts into sealing engagement and brings the inclined surfaces 25 and 26 firmly together to prevent any fluid leakage.

Fig. 5 shows a modification of the locking and sealing means just described. In this modification the disc 40 may be retained in place by means of an enlarged compressible gasket 44 which is held in place by an outside plate 45, secured by screws as shown.

Though this invention is shown and described as being particularly applied to a welding device of the oxy-arc underwater welding type, still the features thereof are also adaptable to other types of welding electrode holder construction, and it will be apparent to those skilled in the art that various modifications thereof may be made without departing from the spirit and scope of this invention. It is desired, therefore, that this invention be limited only by the scope of the prior art and the appended claims.

The invention described herein may be manufactured and used by or for the Government of the United States of America for governmental purposes without the payment of any royalties thereon or therefor.

Having thus described the invention, what it is claimed and desired to be secured by Letters Patent, is:

1. An electrode holder for tubular electrodes, comprising, a handle portion having fluid and electrical connections extending therethrough, an electrode grasping means on one end of the handle and an adjustable union between the electrode grasping means and the handle, the union being adapted for the simultaneous conduction of fluid and electrical current to the electrode.

2. An electrode holder comprising a fluid conduit, an electrical conduit, said conduits having a wrapping binding them together in fixed relationship to form a rigid handle, a housing forming part of said handle, said housing having the conduits connected thereto to form a common fluid and electrical terminal, an articulated extension of said handle comprising a tubular metal elbow for conducting both the fluid and electrical current, a swivel coupling between the elbow and the housing maintaining both fluid and electrical continuity, and a chuck attached to the elbow having an insulating jaw-actuating nut, gripping jaws and self-adaptable means for producing a fluid and electrical current seal with a hollow electrode as said nut is turned to tighten the jaws.

3. An electrode holder comprising an electric current supply wire, a fluid inlet pipe, a swivel joint housing in which the wire and pipe have common connection, a tubular elbow member turnably mounted in the housing to compose a swivel joint and constituting both an electrical current and fluid conductor, and a chuck carried by the elbow, said chuck having inherently loose means for producing a fluid and electrical current seal between the elbow and a hollow electrode when gripped by the chuck.

4. An electrode holder comprising an electric current supply wire, a fluid inlet pipe, a swivel joint housing to which the wire and pipe have common connection, a tubular elbow member turnably mounted in the housing to compose a swivel joint and constituting both an electrical current and fluid conductor, and a chuck carried by the elbow, said chuck having inherently loose means capable of self-adaptation to the chuck for producing a progressively tighter seal between the elbow and a hollow electrode as the chuck is tightened upon said electrode.

5. An electrode holder comprising fluid and electric current conduits, a housing to which each of said conduits is affixed thus composing a common terminal, a chuck for gripping a hollow electrode, and a tubular elbow connecting the chuck to the housing and serving as a common fluid and current conductor to the electrode.

6. An electrode holder comprising an electrical conduit, a fluid conduit, a housing having both conduits connected thereto to form a common fluid and electrical terminal, a valve in the fluid conduit and means for insulating the valve and fluid conduit from said terminal, a tubular elbow member turnably mounted in the housing to compose a swivel joint and constituting both an electrical current and fluid conductor, and a chuck carried by the elbow, said chuck having means for producing a fluid and electrical current seal between the elbow and a hollow electrode when gripped by the chuck.

7. An electrode holder comprising an electrical conduit, a fluid conduit, a housing having both conduits connected thereto to form a common fluid and electrical terminal, a valve in the fluid conduit and means for insulating the valve and fluid conduit from said terminal, a wrapping around parts of the conduits and valve, forming a rigid handle, a tubular elbow member turnably mounted in the housing to compose a swivel joint and constituting both an electricity and fluid conductor, and a chuck carried by the elbow, said chuck having means for producing a fluid and electrical current seal between the elbow and a hollow electrode when gripped by the chuck.

BELA RONAY.

REFERENCES CITED

The following references are of record in the file of this patent:

UNITED STATES PATENTS

| Number | Name | Date |
|---|---|---|
| 1,438,497 | Jones | Dec. 12, 1922 |
| 1,609,859 | Bond | Dec. 7, 1926 |
| 1,910,668 | Bevard | May 23, 1933 |
| 2,277,894 | Welsh | Mar. 31, 1942 |
| 2,350,426 | Thompson | June 6, 1944 |

FOREIGN PATENTS

| Number | Country | Date |
|---|---|---|
| 236,098 | Great Britain | July 2, 1925 |